United States Patent [19]

Ichiki

[11] Patent Number: 5,178,587
[45] Date of Patent: Jan. 12, 1993

[54] EXPANDED TIMING BETWEEN GEAR TRAINS OF DIFFERENTIALS

[75] Inventor: Shiro Ichiki, Rochester, N.Y.

[73] Assignee: Zexel-Gleason USA, Inc., Rochester, N.Y.

[21] Appl. No.: 765,045

[22] Filed: Sep. 24, 1991

[51] Int. Cl.$^5$ .............................................. F16H 1/38
[52] U.S. Cl. ................................. 475/227; 475/344; 475/904
[58] Field of Search ................. 475/226, 227, 344, 904

[56] References Cited

U.S. PATENT DOCUMENTS

| | | | |
|---|---|---|---|
| 2,859,641 | 11/1958 | Gleasman | 475/227 |
| 3,292,456 | 12/1966 | Saari | 475/904 X |
| 3,735,647 | 5/1973 | Gleasman | 475/227 |
| 3,849,862 | 11/1974 | Benjamin | 29/407 |
| 3,875,824 | 4/1975 | Benjamin | 475/158 |
| 3,902,237 | 9/1975 | Benjamin | 29/407 |
| 4,491,036 | 1/1985 | Stritzel | 475/227 |
| 4,750,383 | 6/1988 | Stritzel | 475/227 |
| 4,754,661 | 7/1988 | Barnett | 475/904 X |
| 4,805,487 | 2/1989 | Pedersen | 475/226 |
| 4,864,893 | 9/1989 | Hori | 475/344 X |
| 4,916,978 | 4/1990 | Razelli | 475/226 |
| 4,938,099 | 7/1990 | Knight | 475/226 |
| 5,088,970 | 2/1992 | Dye | 475/227 |

FOREIGN PATENT DOCUMENTS

WO8905933  6/1989  PCT Int'l Appl. ................. 475/227

Primary Examiner—Leslie A. Braun
Assistant Examiner—Benjamin Levi
Attorney, Agent, or Firm—Eugene Stephens & Associates

[57] ABSTRACT

A gear differential having multiple gear trains interconnecting a pair of output shafts is provided with an arrangement of gearing having an expanded relationship between tooth numbers of the gearing for fitting the gear trains into mesh. The gearing includes two side gears (20 and 21) coupled to respective output shafts and three pairs of combination gears (24 and 25, 26 and 27, and 28 and 29) for interconnecting the two side gears. Each of the combination gears includes a middle gear portion (40) and two end gear portions (42 and 44). The middle and end gear portions have respective numbers of teeth that share a greatest common factor (GCF) that is more than one but less than the number of teeth in the middle gear portion.

12 Claims, 2 Drawing Sheets

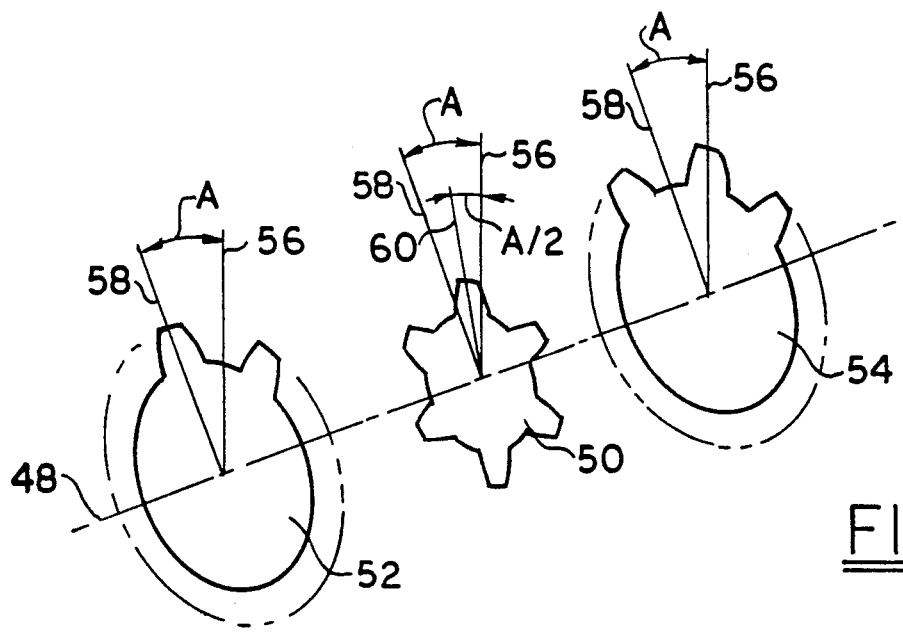
FIG. 2
FIG. 3
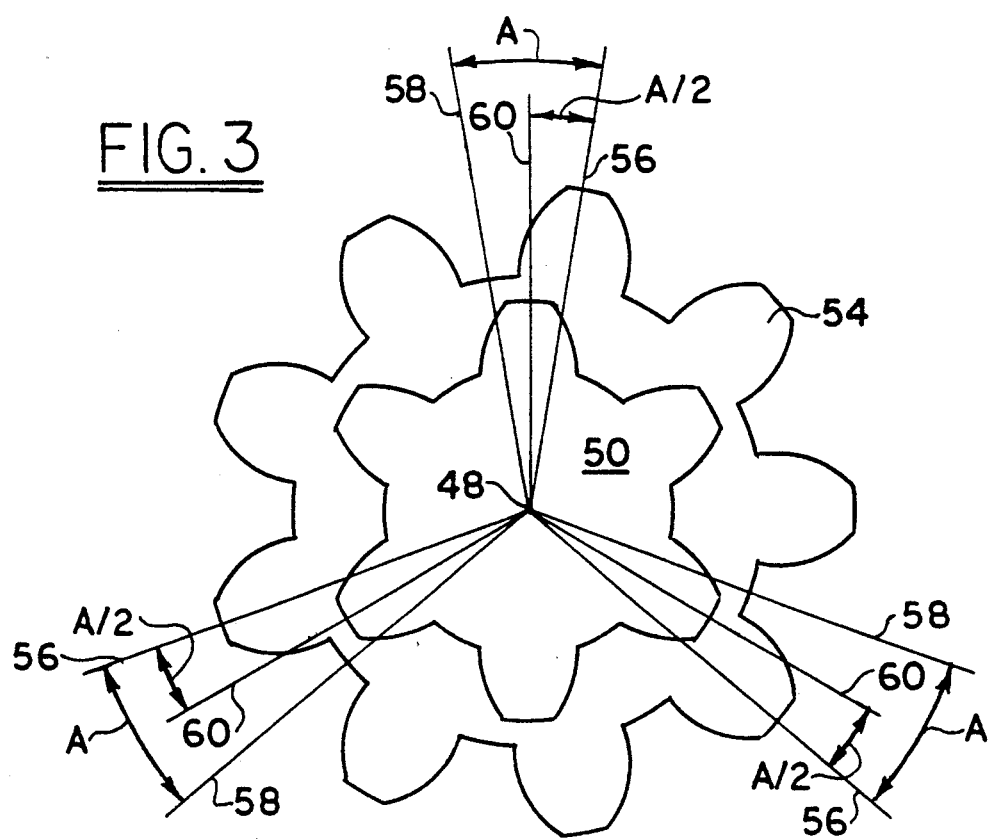

EXPANDED TIMING BETWEEN GEAR TRAINS OF DIFFERENTIALS

TECHNICAL FIELD

The invention relates to gear assemblies of differentials used in automotive drive lines in which more than one gear train is used to interconnect output shafts of the differentials. Each gear train includes gear members having separate gear portions with different numbers of teeth that can only be fit into mesh with each other and with other gears of the assembly at particular rotational positions.

BACKGROUND

Gear differentials include compound planetary gear sets carried within a differential housing for interconnecting a pair of output drive shafts in a manner that permits the two drive shafts to rotate in opposite directions with respect to the housing. Sun gear members of the respective planetary gear sets, also referred to as "side" or "end" gears, are coupled to inner ends of the two drive shafts. Planet gear members of the respective planetary gear sets, also referred to as "element" or "spider" gears, interconnect the two sun gears for rotation in opposite directions.

The sun gears are coupled to the respective drive shafts for rotation about a common axis. However, the planet gears are mounted for rotation about axes that can be variously offset and inclined with respect to the common axis of the sun gears and drive shafts. In fact, the relative positions of the sun and planet gear axes in large part determine the kind of gearing that make up the planetary sets. For example, spur or helical gears are used when the sun and plant axes are parallel. However, when the axes intersect at right angles, bevel gears are used. Worm or helical gears are used when the axes are inclined but do not intersect.

Some gear differentials that are made with worm or helical gears include planet members that are formed as "combination" gears having at least two gear portions. One portion of each combination gear meshes with one of the sun gears, and the other portion of each combination gear meshes with another combination gear. The combination gears are mounted in pairs about the periphery of the sun gears. Each pair of combination gears forms a separate gear train interconnecting the sun gears. The separate gear trains increase power transmitting capabilities of gear differentials but also complicate design and assembly of the planetary gear sets.

Once one of the pairs of combination gears has been assembled for interconnecting the sun gears, relative rotational positions between the sun gears are established; and the other pairs of combination gears must be assembled in a manner that preserves this established relationship between sun gears. Otherwise, the other pairs of combination gears will not fit properly into mesh. Moreover, not all combinations of gear tooth numbers for a given number of combination gear pairs will enable all of the combination gears to fit properly into mesh. In other words, the gear trains must be designed with regard to the tooth numbers of their gear members to enable the gear trains to fit into mesh at particular rotational positions between the members. Relationships between the combination gear pairs of different gear trains required to fit the combination gears properly into mesh are referred to as "timing".

In worm gear differentials of the type disclosed in US-A-2 859 641 (GLEASMAN), timing requirements are met by mounting each combination gear in a particular order and at a distinct rotational position with respect to other combination gears. Such particular mounting positions cannot be readily ascertained from the mere appearance of the combination gears, and a large number of possible mounting positions that do not meet the timing requirements can make trial and error assembly procedures impractical. There is also a danger that combination gears could be fit into mesh at inexact positions that would prevent the gear trains from sharing equal loads.

Accordingly, special assembly procedures have been used to ensure that the gear trains are properly assembled. Examples of such procedures are found in a series of patents commonly owned herewith identified as US-A-3 849 862, US-A-3 875 824, and US-A-3 902 237 (all to BENJAMIN). These patents disclose use of reference marks that are placed in predetermined positions on the combination gears. The reference marks are used to help index each combination gear with respect to the other combination gears by predetermined angular amounts that allow all of the gears to be fit into mesh.

These assembly procedures using reference marks are cumbersome and time consuming. Typically, it is necessary to identify the reference mark on each combination gear and to mount the gear in a particular rotational position following a prescribed sequence with the other combination gears. The particular rotational positions at which the combination gears are assembled can vary significantly between different arrangements of tooth numbers in the combination gears.

The combination gears of the known worm gear differentials have respective middle gear portions for meshing with one of two side gears and two end portions for meshing with a paired combination gear. The two end portions have respective gear teeth that are indexed relative to each other, usually by one-quarter circular pitch. However, combination gear members of each pair have respective end portions that are indexed in opposite directions for fitting the two end portions of the combination gear members of each pair into mesh. The different combination gear members of each pair further complicate assembly of the known worm gear differentials by requiring the combination gears to be sorted prior to mounting them in a particular rotational position.

However, a commonly owned copending U.S. patent application Ser. No. 460,131, now U.S. Pat. No. 5,088,970, filed on May 25, 1990, entitled Timing of Multiple Gear Train Differential, proposes rules to fit combination gear pairs properly into mesh without using special timing marks on the gears. Other rules enable both members of the combination gear pairs to share a common gear design and to be mounted in either of two axial orientations within the differential. This copending application is hereby incorporated by reference.

According to one of the rules proposed in the copending application, the number of teeth in each end gear portion must be an integer multiple of the number of teeth in the middle gear portion. Another rule requires that twice the product of this integer multiple and the number of side gear teeth all divided by the number of combination gear pairs must equal an integer. The latter rule assures that it is possible to assemble the separate gear trains in properly timed positions. The former rule in concert with the latter rule assures that it is possible to fit any one of the middle gear teeth into mesh with teeth in the side gears. Although not all of the end gear teeth will fit into mesh, the two rules also assure that any end gear teeth that do fit into mesh are properly timed with respect to all other of the combination gears. The end gear teeth that do not fit into mesh are associated with rotational errors between the teeth of the middle gear portions and the side gear teeth at least equal to the angular spacing between the end gear teeth. This prevents improper assembly of the combination gears.

Although the two rules proposed in the copending application provide for eliminating special reference marks and for preventing misassembly of combination gears in improperly timed positions, the rules severely limit the selection of tooth numbers for the side and combination gears. For example, the requirement for an integer multiple relationship between middle and end gear teeth of the combination gears limits the numbers of end gear teeth that are usable with any one number of middle gear teeth. Under most practical circumstances, the choice of end gear teeth is further limited to multiples of two or three times the number of middle gear teeth. However, different end gear tooth numbers are often preferred because of strength considerations or size constraints.

The copending application proposes another rule that requires the teeth at opposite ends of the combination gears to be indexed with respect to each other through one-half circular pitch. This assures that the combination gear members of each pair have the same design and thus are interchangeable. Yet another rule requires all of the middle gear teeth to be located in positions that bisect the one-half pitch index between the end gear teeth. This assures that the combination gears can be mounted in either of two axial orientations within the differential and thus are invertible.

The two rules that enable the combination gears to be both interchangeable and invertible depend from the two earlier mentioned rules that limit the tooth number combinations of the side and combination gears. For example, it is not possible for all of the middle gear teeth to bisect the one-half circular pitch index between opposite end gear teeth unless the number of gear teeth at each end is limited to an integer multiple of the number of middle gear teeth. Further, there is no advantage to making the combination gears interchangeable or invertible unless the combination gears can be assembled together in a properly timed relationship for interconnecting the side gears.

SUMMARY OF INVENTION

This invention provides more flexibility in the design of multiple gear train differentials by expanding tooth number combinations of gear members that can only be assembled in properly timed positions. In particular, the invention expands not only the number of gear tooth combinations that can properly fit into mesh but also expands the number of these combinations that cannot otherwise fit into mesh at improperly timed positions. That is, any of the expanded range of gears that fit into mesh are properly timed with respect to all other of the gears completing the multiple gear trains. The invention also limits a number of "trial and error" attempts to assemble the gear trains without resort to applying reference marks on the gears.

The multiple gear train differentials with which the invention is concerned include a housing rotatable about a pair of drive shafts, side gears disposed within the housing for rotation with the drive shafts, and pairs of combination gears interconnecting the side gears for opposite directions of rotation with respect to the housing. Each of the combination gears includes a first gear portion for meshing with one of the side gears and a second gear portion for meshing with another combination gear.

The side gears include "Ns" number of teeth, the first gear portion of each combination gear includes "$N_{c1}$" number of teeth, and the second gear portion of each combination gear includes "$N_{c2}$" number of teeth. The numbers of combination gear teeth $N_{c1}$ and $N_{c2}$ have a greatest common factor "GCF" that is greater than one but less than the number of teeth $N_{c1}$. This relationship between the tooth numbers of the combination gear portions significantly expands the choice of gear teeth in the second gear portions for any given number of teeth in the first gear portions beyond the previously proposed integer multiple relationship between teeth of the two gear portions. However, this relationship retains significant limits to the number of trial and error attempts that may be required to assemble the gear trains.

As a practical matter, each side gear is independently rotatable with respect to the housing through a predetermined amount of backlash "B", measured in degrees. The factor GCF, the number of gear teeth $N_{c2}$ in the second gear portions, and the number of side gear teeth $N_s$ are related to backlash B according to the following inequality:

$$B < \frac{360° * GCF}{N_{c2} * N_s}$$

where the symbol "<" means "less than" and the symbol "*" indicates an operation of multiplication.

This inequality further limits available combinations of tooth numbers $N_{c1}$, $N_{c2}$, and $N_s$ to assure that if the combination of tooth numbers can be placed in mesh in a properly timed relationship between gear trains, then any other way in which the combination gears can be assembled will also fulfill the timing requirements between gear trains. Although this inequality further limits the available combinations of tooth numbers, many other tooth number combinations satisfy these conditions that do not meet the previously proposed integer multiple relationship between teeth of the two combination gear portions.

The invention also provides for limiting attempts to fit any one combination gear into mesh to a maximum number of teeth "$N_t$" of the second combination gear portions that can be indexed before fitting both portions properly into mesh. The number $N_t$ is determined by the following equality:

$$N_t = \frac{N_{c2}}{GCF}.$$

The invention also identifies an extended range of tooth number combinations that can be assembled in properly timed positions. In fact, several different sufficient conditions are proposed in accordance with this invention for identifying combinations of tooth numbers that can be placed in mesh in accordance with properly timed relationships between gear trains. These conditions are expressed by the following two alternative equalities:

$$I = \frac{2 * N_s}{N_w} \text{ or } I = \frac{N_t}{N_w}$$

where "I" is an integer and "$N_w$" is the number of gear trains that are evenly distributed about the side gears.

The first of the two above-identified sufficient conditions for timing gear trains is closest to the single condition that was known previously. However, the previous condition was also further limited by multiplying the numerator of the equated expression by the earlier mentioned integer multiple. The second of these two sufficient conditions further expands tooth number combinations that can be considered for meeting the earlier mentioned requirements to prevent assembly of improperly timed gear trains.

The combination gears having an extended range of tooth numbers can also be made both interchangeable and invertible in accordance with this invention. The combination gears are made with a middle gear portion (corresponding to the earlier mentioned first portion) for meshing with the side gears and with two spur gear end portions (corresponding to the earlier mentioned second portion) for meshing with a paired combination gear. Gear teeth in the two spur gear end portions are indexed relative to each other through one-half circular pitch of the spur gears. In addition, any one but no more than the factor GCF number of middle gear teeth bisects the one-half pitch index between the spur gear end portions. Since the factor GCF is a number that is less than the number of middle gear teeth (i.e., teeth in the first portion), the range of tooth numbers in combination gears that can be made both interchangeable and invertible is correspondingly extended.

Thus, the present invention includes an expanded range of gear tooth number combinations of side and combination gears that can only be placed in mesh at properly timed positions. This is done by better identifying the gear tooth combinations that can be placed in properly timed positions and, of these, by also better identifying gear tooth combinations that cannot be entered into mesh at improperly timed positions. The combination gears of the present invention are also interchangeable and invertible and can be assembled within a limited number of attempts without use of reference marks.

DRAWINGS

FIG. 2 is a schematic perspective view of a middle gear portion two end gear portions of a combination gear in respective transverse planes.

FIG. 3 is a schematic end view of the same combination gear showing the middle gear portion and one of the end gear portions in the same transverse planes.

BEST MODES FOR CARRYING OUT THE INVENTION

Figure 1:
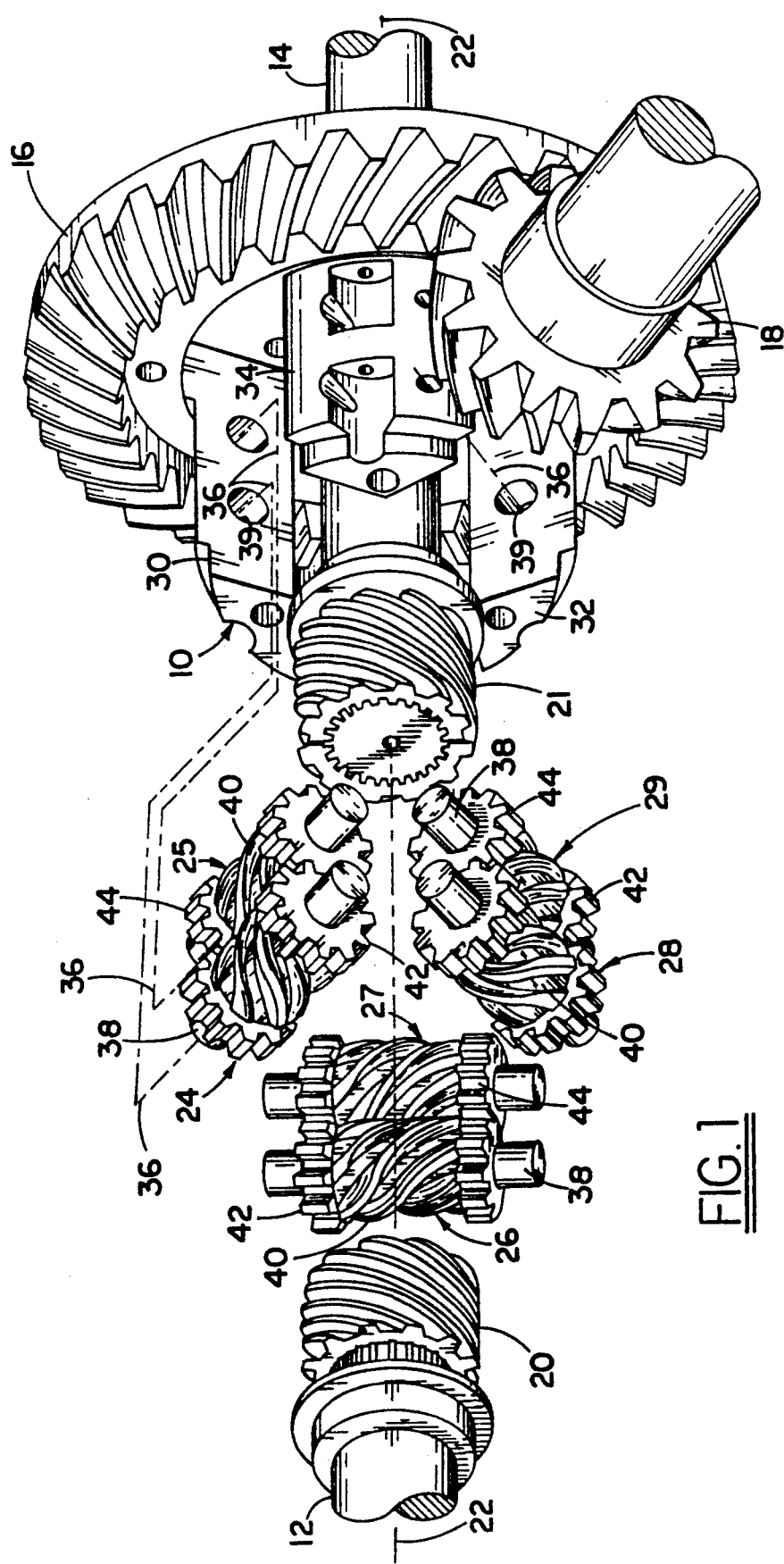
FIG. 1 is an exploded view of a known multiple gear train differential showing all of the different gears that are part of the multiple gear trains.

A known differential of a type that can especially benefit from the present invention is shown in the exploded view of FIG. 1. The differential includes a housing 10 that is rotatable about one or the other of a pair of drive shafts 12 and 14. Rotation is imparted to the housing in a conventional manner by ring gear 16 and pinion 18, which are shown as a hypoid gear set. Side gears 20 and 21, which are formed as worm or helical gears, are coupled to respective inner ends of the two drive shafts 12 and 14. The housing 10, the pair of drive shafts 12 and 14, the ring gear 16, and both side gears 20 and 21 are rotatable about a common axis 22.

Three pairs of combination gears 24 and 25, 26 and 27, and 28 and 29 operatively interconnect the two side gears 20 and 21 for rotation in equal amounts but in opposite directions with respect to the housing 10. Each of the three pairs of combination gears also forms a separate gear train interconnecting the side gears. The housing 10 includes three pedestals 30, 32, and 34 that form between them windows for mounting the combination gears in pairs at equiangularly spaced intervals about the side gears. The combination gears are held in place within the windows for rotation about their respective axes 36 by journal pins 38 that are received in bores 39 formed in the pedestals.

Each combination gear includes a middle gear portion 40, which is formed as a worm wheel, and two end gear portions 42 and 44, which are formed as spur gears. The middle gear portions 40 of the combination gears 24, 26, and 28 include teeth that mesh with teeth of side gear 20. The end gear portions 42 and 44 of the same combination gears have teeth that mesh with teeth of corresponding portions of the other combination gears 25, 27, and 29. The middle gear portions 40 of the other combination gears include teeth that mesh with teeth of the other side gear 21.

The two side gears 20 and 21 each have "$N_s$" number of teeth. The middle gear portion 40 of each combination gear has "$N_{c1}$" number of teeth, and the end gear portions 42 and 44 of the combination gears have "$N_{c2}$" number of teeth. Also, there are "$N_w$" number of gear trains (i.e., combination gear pairs) located at equiangular intervals about the side gears. In the differential of FIG. 1, $N_w$ is equal to three gear trains spaced at one hundred and twenty degree intervals about the side gears 20 and 21.

One of two sufficient conditions must be met to fit all of the $N_w$ number of gear trains properly into mesh with the two side gears. The first sufficient condition can be stated by the following equality:

$$I = \frac{2 * N_s}{N_w}$$

where "I" is an integer. The second of the two sufficient conditions can be written as follows:

$$I = \frac{N_t}{N_w}$$

where "$N_t$" is an expression based on a greatest common factor or "GCF" between the numbers of teeth $N_{c1}$ and $N_{c2}$ of the two combination gear portions. For example, if there are six middle gear teeth and nine end gear teeth, the greatest common factor of six and nine is three. The complete expression $N_t$ can be found as follows:

$$N_t = \frac{N_{c2}}{GCF}.$$

The expression $N_t$ also has other significance as a maximum number of end gear teeth 42 and 44 that can be indexed between meshes with a paired combination gear before the teeth of the middle gear portion 40 fit properly into mesh with a mating side gear. The factor GCF is limited to numbers greater than one but less than the number of teeth $N_{c1}$ of the middle gear portions. Factors of one require up to all of the end gear teeth $N_{c2}$ to be tried before the combination gears are properly fit into mesh. Factors equal to the number of teeth $N_{c1}$ of the middle gear portions are equivalent to the previously known integer multiple relationship between teeth in the two combination gear portions.

The improperly timed positions are avoided by associating large rotational errors between the middle gear portions 40 and the side gears 20 and 21 with improperly timed positions of mesh between the end gear portions 42 and 44 of mating combination gears. That is, the errors at improperly timed positions are made so large that the gear trains cannot be put together in the improper positions. However, instead of providing for these large errors by requiring the errors to be at least equal to one angular pitch of the end gears, the present invention takes a more pragmatic approach by requiring the errors to exceed a predetermined amount of backlash in the gear trains. Gear rotational positions exhibiting timing errors in excess of this backlash cannot be fit into mesh.

Each side gear is independently rotatable with respect to the housing through a predetermined amount of backlash "B", measured in degrees. Gear tooth combinations exhibiting timing errors in excess of this backlash can be identified from the following inequality:

$$B < \frac{360° \cdot GCF}{N_{c2} \cdot N_s}.$$

All together, the combinations of tooth numbers and gear trains that satisfy the requirements for integer I, expression $N_t$, and backlash B, where factor GCF is greater than one but less than $N_{c1}$, extend well beyond the known combinations for differential gear trains that can only be fit into mesh at properly timed positions. These requirements also eliminate need for reference marks by limiting the number of end gear teeth trials required to fit the combination gears into mesh, in addition to preventing the gears from meshing in improper positions.

Although the number of teeth in the end gear portions 42 and 44 is not an integer multiple of the number of teeth in the middle gear portions 40, the combination gears can also be made both interchangeable and invertible. For example, FIGS. 2 and 3 depict necessary requirements for making combination gears fulfilling requirements of the present invention both interchangeable and invertible.

In FIG. 2, middle gear portion 50 and two spur gear end portions 52 and 54 are schematically depicted as they might appear in respective transverse planes along combination gear axis 48. In the case of the combination gears of FIG. 1, the transverse plane of the depicted middle gear portion 50 includes the common axis 22 of the side gears. Angular positions of the respective combination gear teeth are measured with respect to reference lines shown in all three planes. Reference lines 56 extend through the centers of teeth (i.e., the centers of transverse circular tooth thickness) in spur gear portion 54. Other reference lines 58, which extend through the centers of adjacent teeth in the spur gear portion 52, are indexed about combination gear axis 48 through angle "A" at one-half angular pitch of the end gears. For example, if the number of spur gear teeth $N_{c2}$ is nine (see FIG. 3), then the teeth in the two spur gear portions 52 and 54 are indexed with respect to each other through twenty degrees of angular rotation about axis 48. At one-half pitch index between the two spur gear portions, the same design of combination gears can be used to mesh with both side gears (e.g., side gears 20 and 21).

The same combination gears can be made invertible by locating at least one of reference lines 60 passing through the centers of teeth in the middle gear portion 50 in positions that bisect the angle A between the teeth of the end gear portions. Thus, the angle formed between the common reference lines 56 or 58 and some of the reference lines 60 is equal to one-half angle A, denoted in the drawings as "A/2". In other words, some of the middle gear teeth have midpoints of circular tooth thickness that lie equidistantly between corresponding midpoints of said spur gear teeth that span a one-half circular pitch index between the end gear portions. If any one of the middle gear teeth is arranged to bisect the angle A between end gear portions, then other middle gear teeth similarly bisect different adjacent teeth of the end gear portions totaling the factor GCF. Since the factor GCF includes numbers less than the number of middle gear teeth, the range of tooth numbers in combination gears that can be made both interchangeable and invertible is thereby extended.

I claim:

1. A differential having compound planetary gearing assembled without reference marks applied to the gears comprising:

a housing rotatable about a pair of drive shafts; side gears disposed within said housing for rotation with said drive shafts;

pairs of combination gears separately interconnecting said side gears for rotation in equal amounts but in opposite directions with respect to said housing;

each of said combination gears including a first gear portion for meshing with one of said side gears and a second gear portion for meshing with another combination gear;

each of said side gears including "$N_s$" number of teeth, said first gear portion of each combination gear including "$N_{c1}$" number of teeth, said second gear portion of each combination gear including "$N_{c2}$" number of teeth, and said numbers of teeth $N_{c1}$ and $N_{c2}$ in the first and second combination gear portions having a greatest common factor "GCF" that is greater than one but less than said number of teeth $N_{c1}$ in the first combination gear portions; and each of said side gears being independently rotatable with respect to said housing through a predetermined amount of backlash "B" in degrees, wherein said factor GCF, said number of gear teeth $N_{c2}$ in the second gear portions, and said number of side gear teeth $N_s$ are related to backlash B according to the following inequality:

$$B < \frac{360° \cdot GCF}{N_{c2} \cdot N_s}.$$

2. The differential of claim 1 wherein a maximum number of teeth "$N_t$" of the second combination gear portions that can be indexed before fitting properly into mesh is determined by the following equality:

$$N_t = \frac{N_{c2}}{GCF}.$$

3. The differential of claim 2 in which said numbers of teeth $N_s$, $N_{c1}$, and $N_{c2}$, along with a number of combination gear pairs "$N_w$" that are evenly distributed about said side gears, satisfy at least one of the following equalities for an integer "I":

$$I = \frac{2 \cdot N_s}{N_w} \text{ or } I = \frac{N_t}{N_w}.$$

4. The differential of claim 3 in which said first portion of the combination gears includes a middle gear portion, said second portion of the combination gears includes two end gear portions, and said two end gear portions have identical numbers of spur gear teeth that are indexed with respect to each other through one-half circular pitch of said end gear portions.

5. The differential of claim 4 in which a number of middle gear teeth equal to said factor GCF have midpoints of circular tooth thickness that lie equidistantly between corresponding midpoints of said spur gear teeth that span said one-half circular pitch index between the end gear portions.

6. A method of assembling the differential according to claim 2 including the steps of:
mounting said side gears within said differential housing;
mounting one member of each combination gear pair in mesh with one of said side gears by positioning any one of said teeth in the first combination gear portion in mesh with said one side gear; and
mounting the other member of each combination gear pair in mesh with said one member of each combination gear pair and with the other of said side gears by indexing said other member by no more than said $N_t$ number of teeth in the second combination gear portion relative to said one member and by positioning one of no more than a number of said teeth in the first gear portion equal to said factor GCF in mesh with said other side gear.

7. A differential gear assembly comprising:
a housing rotatable about a pair of drive shafts; side gears disposed within said housing for rotation with said drive shafts;
pairs of combination gears separately interconnecting said side gears for rotation in equal amounts but in opposite directions with respect to said housing;
each of said combination gears including a middle gear portion for meshing with one of said side gears and two end gear portions for meshing with another combination gear;
said two end gear portions having respective spur gear teeth that are indexed with respect to each other through one-half circular pitch of said end gear portions; and
at least one but not all teeth of said middle gear portions having midpoints of circular tooth thickness that lie equidistantly between corresponding midpoints of said spur gear teeth that span said one-half circular pitch index between the end gear portions.

8. The differential of claim 7 in which each of said side gears includes "$N_s$" number of teeth, said middle gear portion of each combination gear includes "$N_{c1}$" number of teeth, said end gear portions of each combination gear include "$N_{c2}$" number of spur teeth, and said numbers of teeth $N_{c1}$ and $N_{c2}$ in the middle and end combination gear portions have a greatest common factor "GCF" that is greater than one but less than said number of teeth $N_{c1}$ in the middle gear portions.

9. The differential of claim 8 in which a number of middle gear teeth equal to said factor GCF have midpoints of circular tooth thickness that lie equidistantly between corresponding midpoints of said spur gear teeth that span the one-half circular pitch index between the end gear portions.

10. The differential of claim 9 in which each of said side gears is independently rotatable with respect to said housing through a predetermined amount of backlash "B" in degrees, and
said factor GCF, said number of spur gear teeth $N_{c2}$ in the end gear portions, and said number of side gear teeth $N_s$ are related to backlash B according to the following inequality:

$$B < \frac{360° \cdot GCF}{N_{c2} \cdot N_s}.$$

11. The differential of claim 10 wherein a maximum number of spur teeth "$N_t$" of the end gear portions that can be indexed before fitting properly into mesh is determined by the following equality:

$$N_t = \frac{N_{c2}}{GCF}.$$

12. A method of assembling the differential according to claim 11 including the steps of:
mounting said side gears within said differential housing;
mounting one member of each combination gear pair in mesh with one of said side gears by positioning any one of said teeth in the end portion of the one member in mesh with said one side gear; and
mounting the other member of each combination gear pair in mesh with said one member of each combination gear pair and with the other of said side gears by indexing said other member by no more than said $N_t$ number of teeth in the end gear portion relative to said one member and by positioning one of no more than a number of said teeth in the middle gear portion equal to said factor GCF in mesh with said other side gear,
wherein both members of each combination gear pair share a common design so that they can be interchangeably mounted in mesh with either of said side gear, and said two end gear portions of each combination gear are made symmetrical with respect to said middle gear portion so that said combination gears can be mounted in inverted positions with respect to each other.

* * * * *